United States Patent
Wang et al.

(10) Patent No.: US 11,692,440 B2
(45) Date of Patent: Jul. 4, 2023

(54) POLYMER NANO-CLAYS AS MULTIFUNCTIONAL MUD LOGGING BARCODE TRACERS

(71) Applicant: SAUDI ARABIAN OIL COMPANY, Dhahran (SA)

(72) Inventors: Wei Wang, Quincy, MA (US);
Hooisweng Ow, Woburn, MA (US);
Sehoon Chang, Boston, MA (US)

(73) Assignee: ARAMCO SERVICES COMPANY, Houston, TX (US)

( * ) Notice: Subject to any disclaimer, the term of this patent is extended or adjusted under 35 U.S.C. 154(b) by 41 days.

(21) Appl. No.: 17/454,539

(22) Filed: Nov. 11, 2021

(65) Prior Publication Data
US 2023/0140917 A1    May 11, 2023

(51) Int. Cl.
| | | |
|---|---|---|
| E21B 49/00 | (2006.01) | |
| E21B 47/11 | (2012.01) | |
| E21B 21/01 | (2006.01) | |
| C09K 8/24 | (2006.01) | |

(52) U.S. Cl.
CPC .............. *E21B 49/005* (2013.01); *C09K 8/24* (2013.01); *E21B 21/01* (2013.01); *E21B 47/11* (2020.05); *C09K 2208/10* (2013.01)

(58) Field of Classification Search
CPC ........ E21B 49/005; E21B 47/11; E21B 21/01; C09K 8/24; C09K 2208/10
See application file for complete search history.

(56) References Cited

U.S. PATENT DOCUMENTS

| | | | |
|---|---|---|---|
| 8,627,902 B2 * | 1/2014 | Hammer | E21B 21/08 175/42 |
| 10,501,681 B2 * | 12/2019 | Vo | C09K 8/5756 |
| 10,808,529 B2 * | 10/2020 | Ow | G01N 33/2882 |
| 11,203,923 B2 * | 12/2021 | Chopade | E21B 43/26 |
| 2018/0135403 A1 | 5/2018 | Gupta et al. | |
| 2018/0265635 A1 | 9/2018 | Khamatnurova et al. | |

(Continued)

FOREIGN PATENT DOCUMENTS

| | | |
|---|---|---|
| WO | 2015033146 A1 | 3/2015 |
| WO | 2020/081426 A1 | 4/2020 |

OTHER PUBLICATIONS

Abdo, J. and Haneef, M.D., "Clay nanoparticles modified drilling fluids fordrilling of deep hydrocarbon wells", 2013, Applied Clay Science, vol. 86, pp. 76-82. (Year: 2013).*

(Continued)

*Primary Examiner* — D. Andrews
(74) *Attorney, Agent, or Firm* — Osha Bergman Watanabe & Burton LLP

(57) ABSTRACT

A method includes introducing into a drilling fluid a plurality of tags having a first clay nanoparticle and a first polymer embedded into the clay nanoparticle and circulating the drilling fluid and tags through a well during a drilling operation that creates formation cuttings such that the tags interact with the formation cuttings, creating tagged cuttings. The returned cuttings are collected from the circulating drilling fluid at a surface of the well, and the tags on the returned cuttings are detected to identify the tagged cuttings. The method also includes correlating the tagged cuttings with a drill depth in the well from the drilling operation.

20 Claims, 5 Drawing Sheets

(56) References Cited

U.S. PATENT DOCUMENTS

2022/0065101 A1* 3/2022 Poitzsch ................ E21B 47/11

OTHER PUBLICATIONS

Park, Ju-Hwan, et al., "Application of montmorillonite in bentonite as a pharmaceutical excipient in drug delivery systems", Journal of Pharmaceutical Investigation, pp. 363-375, 2016 (13 pages).
Yu, Wei Hua, et al., "Adsorption of proteins and nucleic acids on clay minerals and their interactions: A review", Applied Clay Science, pp. 1-10, 2013 (10 pages).
Blachier, C., et al., "Adsorption of polyamine on clay minerals", Journal of Colloid and Interface Science, pp. 599-606, 2009 (8 pages).
Zhang, Shifeng, et al., "Water adsorption on kaolinite and illite after polyamine adsorption", Journal of Petroleum Science and Engineering, pp. 13-20, 2016 (8 pages).
Mahdavi, Amir Ebrahim Baradaran, et al., "Preparation, Characterization, and Application of Polyacrylamide-Polystyrene/Bentonite Nanocomposite as an Effective Immobilizing Adsorbent for Remediation of Soil", ChemistrySelect, pp. 4538-4547, 2020 (10 pages).
"Molecular Probes Handbook, A Guide to Fluorescent Probes and Labeling Technologies 11th Edition", ThermoFisher Scientific, pp. 19-20, 35, 57, 66, 74, 82, 2010 (12 pages).

\* cited by examiner

POLYMER NANO-CLAYS AS MULTIFUNCTIONAL MUD LOGGING BARCODE TRACERS

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole. Drill cuttings, also referred to as "rock cuttings" or "formation cuttings" are rock fragments generated by the drill bit as the drill bit advances along the borehole.

Drill cuttings provide critical information such as the formation lithology needed for geologic correlation, the mineral composition for marker beds, and input for the petrophysicist or log analyst to corroborate data from other logging techniques. Drill cuttings are often used in mud logging by examining the rock cuttings brought to the surface by the circulating drilling mud. Mud logging may be performed to generate a well log of a borehole, and is particularly critical in underbalanced drilling with coiled tubing, where logging while drilling (LWD) tools are not readily available to the industry due to a reduced hole size.

Mud tags or tracers are often used to tag drill cuttings, which when detected at the surface of the well, may be used to determine mud cycle time (circulation time). However, the inaccuracy of cuttings depth assignment using this technique still needs improvement. Many challenges remain in getting more accurate information on the return-trip lag time of the cuttings back up the annulus, especially in long horizontal sections. When mud return trips are longer than half an hour, it is common to have depth uncertainties of more than ±20 feet. This, in turn, propagates the errors in characterizing the formation according to the depth.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that include introducing a plurality of tags into a drilling fluid, circulating the drilling fluid and tags through a well during a drilling operation that creates formation cuttings such that the tags interact with the formation cuttings, creating tagged cuttings, collecting returned cuttings from the circulating drilling fluid at a surface of the well, detecting the tags on the returned cuttings to identify the tagged cuttings, and correlating the tagged cuttings with a drill depth in the well from the drilling operation. The tags may be made of a first polymer embedded into a first clay nanoparticle.

In another aspect, embodiments disclosed herein methods that include providing at least two different tags, wherein each of the different tags have a polymer with a different molecular weight embedded into a clay nanoparticle and circulating each of the different tags with a drilling fluid through a well while drilling different sections of the well, wherein the different tags interact with formation cuttings during drilling and circulating, creating different tagged cuttings. The methods may also include collecting returned cuttings from the circulating drilling fluid at a surface of the well, detecting the presence of the different tags on the returned cuttings to identify the different tagged cuttings, correlating each of the different tagged cuttings with the different sections of the well, and generating a log of the well including properties of the different tagged cuttings mapped along the corresponding different sections of the well.

In yet another aspect, embodiments disclosed herein relate to methods for forming tags that include providing a polymer solution of first polymer molecules having a first molecular weight, mixing clay nanoparticles in the polymer solution, waiting for an amount of adsorption of the first polymer molecules adsorbing onto the clay nanoparticles, separating the polymer adsorbed clay nanoparticles from the polymer solution, and optionally functionalizing the surface of the polymer adsorbed clay nanoparticles to increase hydrophobicity of the polymer adsorbed clay nanoparticles. Methods disclosed herein may also include mixing the tags with a drilling fluid to circulate through a well.

Other aspects and advantages of the claimed subject matter will be apparent from the following description and the appended claims.

DETAILED DESCRIPTION

Figure 1:
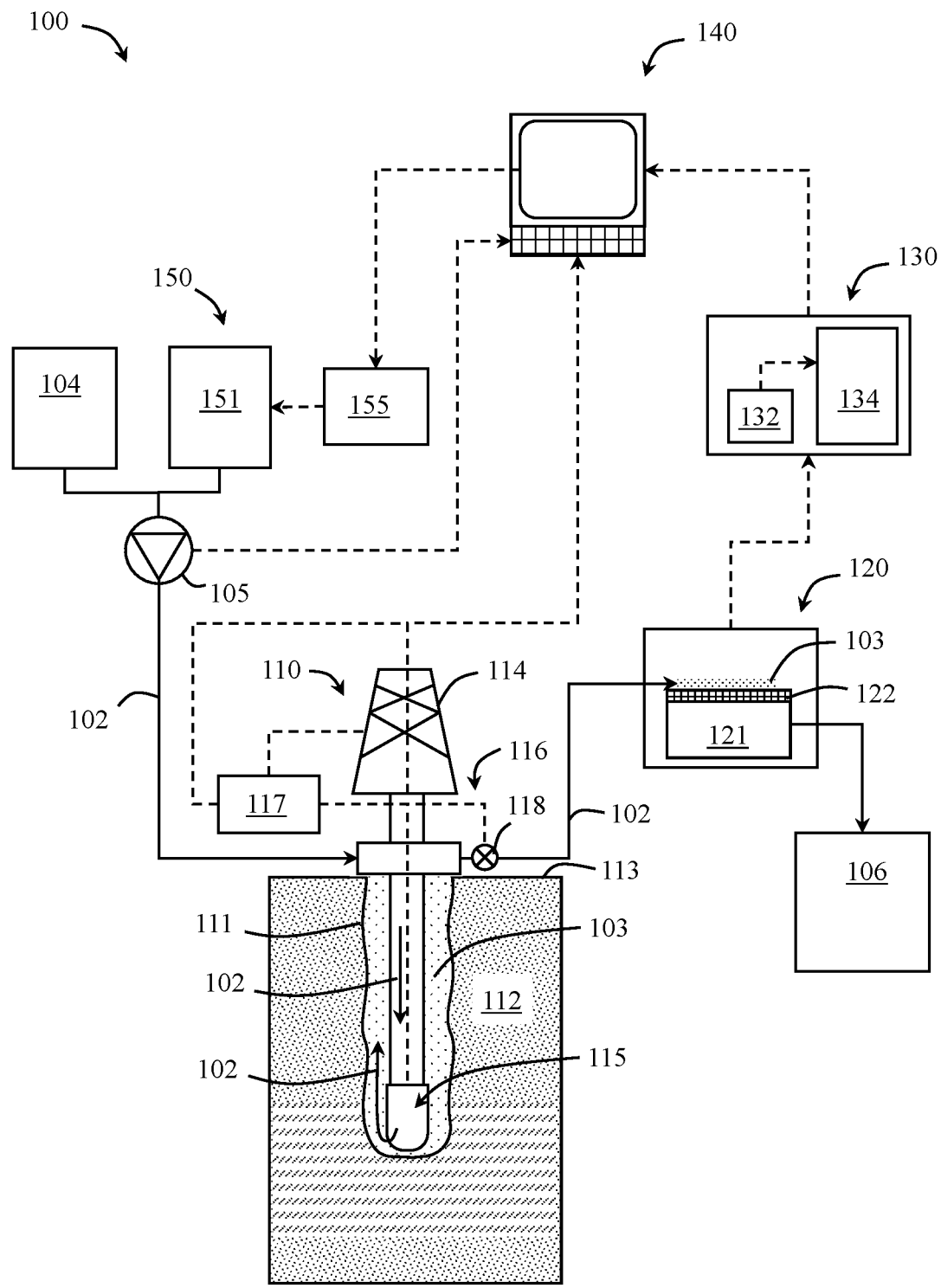
FIG. 1 shows a system according to embodiments of the present disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate generally to tag compositions and mud tracing systems that may be used for tagging formation cuttings as they are being drilled in a wellbore operation in order to more accurately correlate formation characterization data with the depth of the wellbore. Tag compositions disclosed herein may generally include selected polymers incorporated (e.g., adsorbed or impregnated) into clay nanoparticles. Methods of using the tag compositions to determine drill depth of formation cuttings are also described. Tags in accordance with one or more embodiments may be injected into the drilling fluid during drilling operations and travel downhole. The tags may interact with and attach to drill cuttings produced during the drilling process. As such, drill cuttings may be "tagged" with the tags described herein.

According to embodiments of the present disclosure, different tags (e.g., clay nanoparticles having polymers with different base monomers and/or clay nanoparticles having polymers with different molecular weights) may be controllably introduced with the drilling fluid at different drill depths. When tagged cuttings are returned to the surface via circulating drilling fluid, the tags can be identified based upon detection of the polymers from the tags. In such manner, the polymers used in tags according to embodiments of the present disclosure may act as barcode information (e.g., polymer composition and/or polymer molecular weight) to identify the cuttings on which the tags attached. Identified tags may be correlated to an associated drilling depth from when the identified tags were circulated with the drilling fluid. By associating the identified tags with a certain drilling depth, the tagged cuttings may also be identified as originating from the same drilling depth as when the tags were circulated. Thus, disclosed tag compositions may be useful for determining the drilling depth of drill cuttings.

Drilling System

FIG. 1 shows a schematic diagram of a system 100 in which the tags and methods disclosed herein may be used in accordance with one or more embodiments of the present disclosure. In one or more embodiments, one or more of the modules and/or elements shown in FIG. 1 may be omitted, repeated, and/or substituted. As shown in FIG. 1, the system 100 may include a well system 110, a cuttings return system 120, a detection system 130, an analysis and control system 140, and a drilling fluid tagging system 150, which may be directly and indirectly in communication with each other.

The well system 110 may include a well 111 being drilled through a subsurface formation ("formation") 112 to a hydrocarbon-bearing layer of the formation beneath the earth's surface ("surface") 113. The formation 112 may include different layers of rock having varying characteristics, such as varying degrees of permeability, porosity, capillary pressure, and resistivity. In the case of the well system 110 being operated as a production well, the well system 110 may facilitate the extraction of hydrocarbons (or "production") from the hydrocarbon-bearing layer of the formation 112. As the well 111 is drilled through the formation 112, portions of the well may be cased with a casing (extending from the surface of the well) or a liner (extending downhole from an end of a previously installed casing or liner) to line the wellbore wall. The terms "open hole," "borehole," and "wellbore" may be used interchangeably and refer to an uncased portion of a well.

In some embodiments, the well system 110 may include a rig 114 positioned above an opening to the well 111, a well sub-surface system 115, a well surface system 116, and a well control system 117. The well control system 117 may control various operations of the well system 110, such as well production operations, well drilling operations, well completion operations, well maintenance operations, and reservoir monitoring, assessment and development operations. In some embodiments, the well control system 117 may include a computer system that is the same as or similar to that of the analysis and control system 140, described below in more detail.

The rig 114 may hold equipment used to drill a borehole to form the well 111. Major components of the rig 114 may include, for example, drilling fluid tanks, drilling fluid pumps (e.g., rig mixing pumps), a derrick or mast, drawworks, a rotary table or top drive, drill string, power generation equipment and auxiliary equipment.

The well 111 may include a borehole that extends from the surface 113 into the formation 112. An upper end of the well 111, terminating at the surface 113, may be referred to as the "up-hole" end of the well 111, and a lower end of the well, terminating in the formation 112, may be referred to as the "downhole" end of the well 111.

In some embodiments, the well surface system 116 may include a wellhead installed at the "up-hole" end of the well, at or near where the well terminates at the surface 113, where the wellhead may include a rigid structure for supporting (or "hanging") casing and production tubing extending into the well 111. Drilling fluid 102 may be directed through the well sub-surface system 115, including, for example, casing, production tubing, a drill string, and a bottom hole assembly (including a drill bit), and may exit the well 111 through the wellhead back to the well surface system 116. In some embodiments, the well surface system 116 may include flow regulating devices that are operable to control the flow of substances into and out of the well 111. For example, the well surface system 116 may include one or more valves 118 that are operable to control the flow of fluid (e.g., fully open/unrestricted flow, partially open/throttled flow, or closed to block flow) into and out of the well 111.

In some embodiments, the well surface system 116 may include surface sensors for sensing characteristics of fluids passing through or otherwise located in the well surface system 116, such as pressure, temperature and flow rate of fluid flowing through the wellhead, or other conduits of the well surface system 116, after exiting the well 111. Surface sensors may also include sensors for sensing characteristics of the rig 114 and drilling equipment, such as bit depth, hole depth, hook load, rotary speed, weight on bit, etc.

In a drilling operation, drilling fluid 102 may be pumped from a drilling fluid source 104, which may be, for example, supplied through trucks or tanks, where the drilling fluid source 104 may include a premixed drilling fluid or components provided separately that are mixed on site. In some embodiments, the drilling fluid source 104 may include used drilling fluid from a mud pit 106, which includes drilling fluid that was circulated through the well, returned to the surface and cleaned.

Tags according to embodiments of the present disclosure, e.g., tags formed of polymers adsorbed or impregnated into clay nanoparticles, may be mixed with the drilling fluid 102 prior to circulating the drilling fluid 102 through the well 111. Different tags may be introduced to the drilling fluid 102 from the tagging system 150 at different times for drilling different sections of the well 111. For example, in some embodiments, a first tag having a first type of polymer or a polymer with a selected molecular weight may be mixed with the drilling fluid 102 and circulated through the well 111 while drilling a first section of the well. After drilling the first section of the well 111, and when it is predicted that the first tags have circulated out of the well 111, a second tag having a second type of polymer or a polymer with a different molecular weight may be mixed with the drilling fluid 102 and circulated through the well 111 while drilling a second section of the well 111. Tag compositions according to embodiments of the present disclosure are discussed in more detail below.

In some embodiments, different tags may be supplied from a tag injection assembly 151 in the tagging system 150, where the tag injection assembly 151 may include a plurality of tag chambers that each holds a different tag. A controller 155 may be used to operate and control the tag injection assembly 151, e.g., by sending commands to valves and/or pumps in the tag injection assembly 151 to release a selected tag. For example, as drilling fluid 102 is pumped from the drilling fluid source 104 to the well 111, a selected tag may be released from a tag chamber in the tag injection assembly 151 and flowed at a selected rate to mix with and flow with the drilling fluid 102 into the well 111. The controller 155 may be integrated with the tag injection assembly 151 or may be remote from the tag injection assembly 151. In other embodiments, different tags may be mixed with a drilling fluid in other ways (e.g., manually, premixed with the drilling fluid prior to arriving at the drill site, or added from multiple different tag injection assemblies).

The controller 155 may send commands to implement one or more jobs designed by the analysis and control system 140. For example, the analysis and control system 140 may determine an optimized tag release operation and send instructions to the controller 155 for implementing the optimized tag release operation. The controller 155 may then send commands to one or more components in the tag injection assembly 151 (e.g., valves or pumps) to release tags from one or more tag chambers in the tag injection assembly 151 at a given speed and on a schedule according to the optimized tag release operation.

One or more pumps 105 may be used to pump the mixed tags and drilling fluid into the well 111 as the well is drilled. The drilling fluid 102 and tags may be pumped through a drill string extending through the well and out of a bottom hole assembly (e.g., through a drill bit) at an end of the drill string. When the tags are ejected out of the bottom of the drill string with the drilling fluid, the tags may attach to the formation being drilled proximate to the bit. Tags according to embodiments of the present disclosure may have a small size (e.g., at a nanometer-scale or a few micrometer-scale), which allows the tags to stick on or insert into pores of the cuttings, and thus travel together with the cuttings at real time during drilling. As the formation is drilled, cuttings 103 from the formation having the attached tags ("tagged cuttings") may be sent to the cuttings return system 120 at the surface of the well and analyzed in the detection system 130.

When the drilling fluid 102 and returned cuttings 103 are pumped to the surface of the well 111 during a drilling operation, the returned drilling fluid (including the tagged cuttings and other returned cuttings) may be directed via one or more conduits (e.g., piping) to one or more separators 121 (sometimes referred to in the industry as shakers) in the cuttings return system 120. In some embodiments, returned cuttings 103 may automatically be directed to one or more separators 121 based on commands received from the well control system 117. A separator 121 may include, for example, one or more screens 122 arranged in the flow path of the returned drilling fluid to catch and separate returned cuttings from the drilling fluid. According to embodiments of the present disclosure, other methods of filtering or separating returned cuttings 103 from drilling fluid may be used. Once the returned cuttings 103 are separated from the drilling fluid 102, the returned drilling fluid may be directed to a mud pit 106 for storage and/or may be cleaned and reused.

Returned cuttings 103 separated from the drilling fluid may be processed and analyzed using a detection system 130, which may include processing equipment 132 (e.g., equipment used in releasing tags from cuttings and/or releasing polymers from tags) and detection equipment 134 (e.g., equipment used in detecting one or more properties of the polymers in the returned tags).

In some embodiments, cuttings may be tagged with two types of tagging identifications, including a dye and polymer. The dye may be non-barcoded, whereas the polymers may be barcoded by different types and molecular weights. When using such tags, tagged cuttings may be identified from the returned cuttings 103 by visually identifying cuttings having dye incorporated in the tags. Returned cuttings 103 visually identified as having tags thereon may be further processed to identify the type of polymer tagged thereon. In some embodiments, returned cuttings 103 having dye attached thereto (indicating tagged cuttings) may be separated from the returned cuttings without having dye, and the tagged cuttings may be further processed to identify the type of tag attached thereto. In some embodiments, returned cuttings 103 may be further processed without initial identification of tagged cuttings.

According to embodiments of the present disclosure, processing returned cuttings 103 may include pre-screening by fluorescence techniques (e.g., using fluorescence spectroscopy or fluorescence imaging) to detect dye on the cuttings. For example, returned cuttings 103 may be collected at different times in designed intervals. For the collected cuttings, each interval of collected cuttings may first be pre-screened by detecting fluorescence from a dye in a tag using a fluorescence spectrometer or a fluorescence imaging system (such as a fluorescence camera). For the cuttings in which the fluorescence signals are detected from the fluorescent dye in the tags, they may be further analyzed to detect their polymer barcode identification in the tags. In some embodiments, tags may include only polymer tagging identification, in which case, tagged cuttings may be analyzed using polymer analysis without a fluorescence pre-screening step.

Polymer analysis of tagged cuttings may include releasing tags from the cuttings into a solution and/or releasing polymers from the tags using separation equipment 132 such as containers of solution, sonicators, filters, or others. For example, a batch of returned cuttings 103 (including tagged cuttings) may be introduced into a solution, for example, by putting the tagged cuttings in a container containing the solution or by rinsing the tagged cuttings in the solution. A solution for releasing tags from cuttings may include a selected solvent or adjusted pH. In some embodiments, tagged cuttings may be placed in water or other solution, such as methanol, ethanol, isopropanol, acetone, acetonitrile, tetrahydrofuran (THF) and chloroform, and sonication may be applied by a sonicator to release polymers from the tags. Depending on the type of polymers used to form the tags, the pH of the solution may be adjusted to expedite the extraction process of the polymers from the tags. The solution may be designed to release tags from cuttings, for example, using an appropriate chemical formula for the solution to attract the tags away from the cuttings. When tagged cuttings are soaked in a solution or rinsed in a solution, the solution with released polymers may be filtrated from the tagged cuttings, where the released polymer solution may then be analyzed using one or more orthogonal analysis methods in the detection system 130 to identify the tags.

According to embodiments of the present disclosure, a dye in a tag may be directly detected with collected solid cuttings or in solution with released tags. For example, when returned cuttings 103 are soaked in solution, both dye and polymers from tags may be released into the solution.

The detection system 130 may include detection equipment 134 that may determine at least one property of the tags (e.g., the type of polymer used in the tag, the molecular weight of the polymer used in the tag, and/or the type of clay used in the tag). In some embodiments, the detection equipment 134 may include one or more laboratory instruments, such as gel permeation chromatography (GPC), liquid chromatography mass spectrometry (LC-MS) and gas chromatography mass spectrometry (GC-MS). Since the monomer unit type in a tag polymer, the polymer molecular weight, or both may act as barcode information to identify the tag, the extracted tag information can be analyzed by multiple orthogonal detection techniques using one or more detection equipment 134 to detect the barcode information. For example, pyrolysis-GC-MS can identify the monomer type forming the polymer, while GPC can separate and determine the polymers with different molecular weight. If the tags have monodispersed molecular weight at relatively low molecular weight (oligomeric), they can also be analyzed by GC-MS or high pressure liquid chromatography mass spectrometry (HPLC-MS) techniques, such as matrix-assisted laser desorption/ionization-time of flight (MALDI-TOF) or tandem MS.

The tagged cuttings may also be analyzed to determine one or more properties of the cuttings, e.g., type of rock (including rock composition), porosity, permeability, resistivity, hardness, strength, and other material properties of rock formations useful to know for drilling and/or production operations. The cuttings separated from the tags in the tagged cuttings may be analyzed with rock testing equipment, such as nuclear magnetic resonance (NMR) equipment, scanning electron microscope (SEM), flow characterization instruments, pressure and resistivity measurement devices, etc. Rock testing equipment used to identify and determine properties of the cuttings may be part of the detection system 130.

According to embodiments of the present disclosure, equipment used in the detection system 130 may be located on site, near the well 111, or located off-site, distant from the well 111. In some embodiments, the detection system 130 may be provided in a lab.

Detection data collected from the tags, e.g., an identified molecular weight of the polymers in the tags and the type of polymers in the tags, and/or detection data collected from the cuttings of the tagged cuttings may be sent to the analysis and control system 140, where the detection data may be used to correlate the depth in the well 111 from which the cuttings originated. For example, the analysis and control system 140 may include one or more software programs that may receive detection data collected from tags on tagged cuttings and identify the tags, e.g., by comparing the tag detection data (e.g., including types of polymers in the tags, molecular weights of the polymers, or other tag composition data) to a database or list of tags that were sent downhole. Comparison between tag detection data and known tag compositions may be performed automatically (e.g., as the tag detection data is received by the analysis and control system 140) or manually (e.g., by an operator running the comparison). Based on the comparison, the software program(s) may identify the detected tag. Such software programs may be run on one or more computing systems, e.g., including a computer. In some embodiments, comparison of detection data with known tag composition may be performed by a person rather than a software program.

When tags from the returned cuttings 103 have been identified, the identified tags may be correlated with a depth in the well where the tags attached to cuttings ("tag depth"). For example, the timing of when a first tag is pumped downhole with drilling fluid (a time of release for the first tag), the depth of drilling, the pumping rate of the drilling fluid carrying the first tag, downward-trip time through a known drill pipe diameter, and other factors may be known. Based on the time of release of the first tag and other trip time factors (e.g., the depth of drilling and/or the pumping rate) may be used to estimate the tag depth in the well 111 when the first tag reaches the bottom of the well 111, and where the first tag may tag cuttings as they are drilled. Detection data collected from cuttings that were tagged with identified first tags (e.g., type of rock, porosity, resistivity, hardness, and other material properties of the formation rock) may then be correlated with the tag depth of the first tag. In such manner, the formation 112 around the well 111 may be characterized at different tag depths in the well by identifying and analyzing returned tagged cuttings and correlating the properties of the cuttings with the tag depths of the identified tags on the cuttings.

In some embodiments, the analysis and control system 140 may be used to analyze detection data for a first tag and determine when a subsequent tag may be mixed with the drilling fluid and pumped down the well 111 for tagging cuttings at a subsequent tag depth.

Tag Compositions

According to embodiments of the present disclosure, tags may be formed of polymers embedded into clay nanoparticles. Different polymers (e.g., polymers composed with different types of monomers and/or polymers having different molecular weights) may be loaded into clay nanoparticles to form different types of tags (e.g., a first tag having a first polymer loaded into clay nanoparticles, a second tag having a second, different, polymer loaded into clay nanoparticles, and so forth).

Clay nanoparticles may be selected, for example, from montmorillonite, bentonite, illite, kaolinite, palygorskite, sepiolite, or other clay minerals. In some embodiments, clay nanoparticles may be selected to be the same type of clay used in drilling fluid in which the tags are to be circulated with. For example, tags according to embodiments of the present disclosure may be mixed with a drilling fluid having a composition that includes a base fluid and at least one clay component (e.g., bentonite), where the tags may be formed with clay nanoparticles made of the same material as the clay component in the drilling fluid. In some embodiments, the clay nanoparticles may be formed of a different material than the clay component in the drilling fluid.

Polymers in tags according to embodiments of the present disclosure may be selected from commercially available polymers having a selected molecular weight, or polymers may be synthesized from selected monomer types to have a selected molecular weight. In some embodiments, the polymers may be hydrophilic polymers.

Examples of suitable commercially available polymers include, but are not limited to:

poly(ethylene glycol) (PEG) having the below condensed formula with a molecular weight (MW) of 200, 300, 400, 600, 1000, 1500, 3000, 4000, 6000, 12000, 20000, 108000, or 218000;

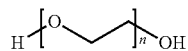

poly(acrylic acid) (PAA), sodium salt having the below condensed formula with a MW of 1250, 16000, or 83000;

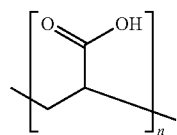

poly(methacrylic acid) (PMAA), sodium salt having the below condensed formula with a MW of 1270, 4000-6000, 9500, 18500, or 483000;

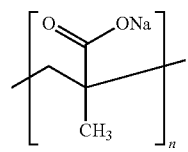

poly(styrenesulfonic acid) (PSS), sodium salt having the below condensed formula with a MW of 210, 4300, 6800, 17000, 20000, 32000, 77000, 150000, or 200000;

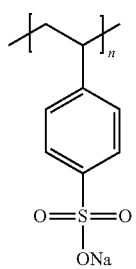

polyacrylamide (PAM) having the below condensed formula with a MW of 10000, 40000, or 150000;

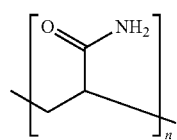

poly(methyl methacrylate) (PMMA) having the below condensed formula with a MW of 2000, 35000, 50000, 120000, 150000, or 350000;

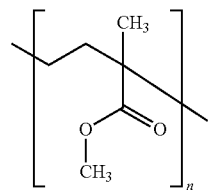

pullulan having the below condensed formula with a MW of 1300, 6000, 12000, 22000, 50000, 110000, 200000, or 800000;

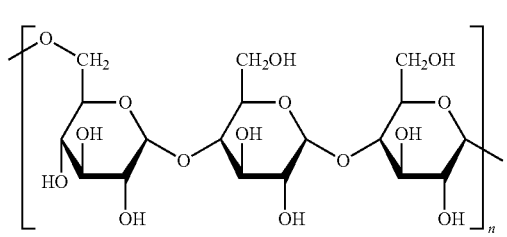

dextran having the below condensed formula with a MW of 1000, 5000, 12000, 25000, 80000, 150000, 270000, 410,000, or 670000;

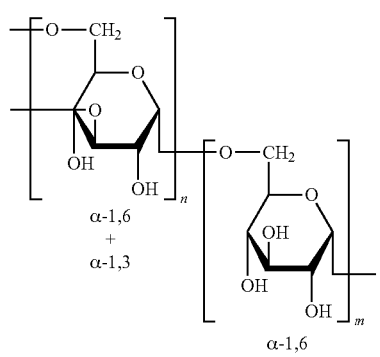

poly(vinyl alcohol) (PVA) having the below condensed formula with a MW of 9000, 27000, 31000, 47000, 67000, 125000, 131000, 145000, 195000, or 205000;

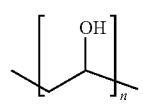

poly(vinylpyrrolidone) (PVP) having the below condensed formula with a MW of 10000, 29000, 40000, 55000, or 360000;

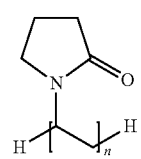

polyethylenimine (PEI), linear, having the below condensed formula with a MW of 2500, 4000, 5000, 10000, or 20000;

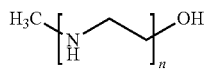

poly(2-oxazoline) having the below condensed formula with a MW of 2000, 5000, 10000, 25000, or 50000;

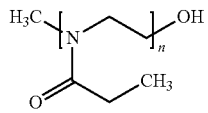

poly(diallyldimethylammonium chloride) (PDADMAC) having the below condensed formula with a MW of <100000, 200000-350000, or 400000-500000; and

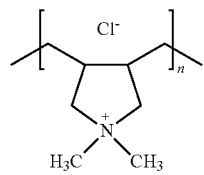

poly(allylamine hydrochloride) (PAH) having the below condensed formula with a MW of 17500 or 50000.

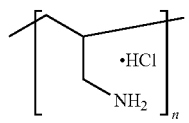

In some embodiments, polymers used to form tags may be designed and synthesized prior to incorporating with clay nanoparticles. For example, discrete polymers and oligomers of various molecular weights can be synthesized via controlled living polymerization processes such as atom transfer radical polymerization (ATRP), ring-opening metathesis polymerization (ROMP), anionic or cationic polymerization, or reversible addition fragmentation chain transfer (RAFT) polymerization.

In some embodiments, synthesizing polymer molecules may include incorporating at least one functional monomer in the polymer, such that a selected functionality may be provided to the polymer molecules. For example, polymer molecules may be synthesized using single unit monomer insertion macromolecular engineering techniques, such that different functionalities, e.g., fluorescence and isotopically labeled monomers (fluorine, chlorine, bromine, etc.), can be incorporated by a sequence-defined manner in the main chain of the polymers.

Polymers may be mixed with a fluid to provide a polymer solution. For example, a polymer solution may include a selected amount of a single type of polymer molecule mixed with an inert base fluid, such as water, water-methanol, water-ethanol, or other solvent that may increase the solubility of the polymers. The polymer concentration may range, for example, from 1 wt. % to 20 wt. % in solution. In some embodiments, one or more co-adsorbents (e.g., a dye) may be added to a polymer mixture, where the co-adsorbent(s) may be provided as part of the polymer solution or may be added after the polymer solution has been mixed.

According to embodiments of the present disclosure, tags may be formed by providing a polymer solution having a plurality of a selected polymer molecule, mixing clay nanoparticles into the polymer solution, and waiting for an amount of first polymer molecules to adsorb onto the clay nanoparticles. For example, a polymer solution may have first polymer molecules with a selected molecular weight and/or a selected type of monomer. A selected type and size of clay nanoparticles may be mixed into the polymer solution, where an amount of the first polymer molecules may adsorb onto the clay nanoparticles. In some embodiments, methods of forming tags may include waiting for an amount of adsorption of the first polymer molecules onto the clay nanoparticles, for example, at least 50 percent, at least 60 percent, at least 70 percent, or at least 80 percent of the first polymer molecules in the polymer solution adsorbed onto the clay nanoparticles. After waiting an adsorption period, resulting clay nanoparticles may each have at least 1 percent, at least 2 percent, at least 5 percent, at least 10 percent, or at least 20 percent of the first polymer molecules adsorbed into the clay nanoparticle.

Clay nanoparticles may have layered structures that can highly swell in water, such as bentonite. The surfaces of the layers in such clay nanoparticles may be highly charged and can serve as super-absorbent for guest molecules (polymers) under specific conditions. For example, bentonite has strong interactions with various polymer molecules. Based on this property, bentonite nanoparticles may be mixed with polymer solution, where a significant amount of the polymers in the polymer solution may be directed to and adsorbed onto the layered structure of the clay. For example, sodium montmorillonite, a predominant component of bentonite, has a strong swelling capacity and can expand its original volume as much as several times by absorbing polymer molecules. Because of its layered structure, the negatively charged surfaces of montmorillonite layers may be charged-balanced by exchangeable ionic species. For instance, cationic compounds can be adsorbed onto montmorillonite via electrostatic interactions. Neutrally charged or organic compounds may adsorb onto clay nanoparticles through other interactions, including hydrogen bonding and van der Waals forces. Additionally, negatively charged compounds may have significant adsorption on clay nanoparticles since some bounded counterions may reduce and screen some electrostatic repulsion between adsorbent and clay.

In some embodiments, methods of forming tags may include introducing one or more co-adsorbents (e.g., a dye or a different labeling material) into a polymer solution, e.g., before adding clay nanoparticles, simultaneously with the clay nanoparticles, or immediately after adding the clay nanoparticles to the polymer solution. For example, in some embodiments, dye or dye grafted polyamines may be co-adsorbed onto clay nanoparticles with polymers. When clay nanoparticles and co-adsorbents are provided in a polymer solution, the co-adsorbents may adsorb onto the clay nanoparticles along with the polymer molecules in the polymer solution. For examples, dye co-adsorbents with isothiocyanate groups (e.g., fluorescein isothiocyanate (FITC) or Rhodamine B isothiocyanate (RBITC)) may covalently bind to polymers containing an amino group (e.g., polyamine or polyethylenimine (PEI)), and positively charged dye co-adsorbents may electrostatically bind to negatively charged polymers. The polymer molecules and associated co-adsorbents may then adsorb onto clay nanoparticles mixed in the polymer solution.

Co-adsorbents such as dye molecules or other labeling materials (e.g., magnets) may bring additional detectable properties that may allow for a rapid pre-screening of cuttings to identify tagged cuttings for further analysis. For example, cuttings that are tagged with tags formed with dye co-adsorbents may be pre-screened using fluorescence spectroscopy or other imaging technique to identify tagged cuttings. The identified tagged cuttings may then be further analyzed to identify barcoded information provided by the polymers of the tags (e.g., identify polymer molecular weight and/or polymer type from the tags).

According to embodiments of the present disclosure, after adding clay nanoparticles to a polymer solution and waiting a time period for polymer molecules to adsorb into the clay nanoparticles, the polymer adsorbed clay nanoparticles may be separated from the polymer solution. The polymer adsorbed clay nanoparticles may then be further processed (e.g., functionalized, dried, and/or mixed with a different solution) to form tags.

In some embodiments, after adsorbing polymer molecules into clay nanoparticles, the surface of the polymer adsorbed clay nanoparticles may be functionalized to have one or more surface property altered. For example, the surface of the polymer adsorbed clay nanoparticles may be functionalized in order to increase hydrophobicity of the polymer adsorbed clay nanoparticles. Functionalizing polymer adsorbed clay nanoparticles may be useful, for example, for providing tags to be circulated downhole with oil-based drilling fluid. Polymer adsorbed clay nanoparticles may be functionalized, for example, by adding wet polymer adsorbed clay nanoparticles (e.g., after removing the polymer adsorbed clay nanoparticles from the polymer solution) to a solvent containing a coupling agent having at least one functional group and allowing the coupling agent to graft to the polymer adsorbed clay nanoparticles, thereby attaching the functional group(s) to the surface of the polymer adsorbed clay nanoparticles.

For example, in some embodiments, polymer adsorbed clay nanoparticles may be functionalized to have a hydrophobic surface by introducing the polymer adsorbed clay nanoparticles into a functionalization solution containing an organic solvent and a silane coupling agent. An organic solvent may be, for example, hexane, and a silane coupling agent may include, for example, a silane compound having a hydrophobic functional group such as octadecyltrimethoxysilane. Other examples of functionalization agents that may be used to functionalize the clay nanoparticles include: octadecyltrimethoxysilane, dodecyltrimethoxysilane, decyltrimethoxysilane, phenyltrimethoxysilane, p-tolyltrimethoxysilane, 1-napthyltrimethoxysilane, or (heptadecafluoro-1,1,2,2-tetrahydrodecyl)trimethoxysilane.

After adding the polymer adsorbed clay nanoparticles to the functionalization solution, functionalization may occur while waiting a period of time for the silane coupling agent to graft into the surface of the polymer adsorbed clay nanoparticles, which may occur via hydrolysis reaction in water, for example. In such manner, grafting silane coupling agents with a hydrophobic functional group to polymer adsorbed clay nanoparticles may attach a hydrophobic functional group to the surface of the polymer adsorbed clay nanoparticles and provide increased surface hydrophobicity. In some embodiments, other coupling agents may be used to provide a hydrophobic functional group grafted on the surface of polymer adsorbed clay nanoparticles. By functionalizing polymer adsorbed clay nanoparticles to have increased surface hydrophobicity (e.g., by grafting a hydrophobic functional group to the clay nanoparticles using a silane coupling agent), the functionalized clay may seal hydrophilic polymers inside the clay layers of the clay nanoparticles. In such embodiments, the formed tags may have hydrophobic functional groups on the surface of the tags and hydrophilic polymers sealed inside clay layers of the tags. Additionally, by forming tags with increased surface hydrophobicity, the tags may successfully be used in oil-based drilling fluids, where the surface hydrophobicity may allow improved dispersion throughout the drilling fluid.

After functionalization of polymer adsorbed clay nanoparticles, the polymer adsorbed clay nanoparticles may be removed from the functionalization solution, rinsed, and dried to provide tags according to embodiments of the present disclosure. The tags may be mixed with a drilling fluid and sent downhole during a drilling operation to tag cuttings as they are formed. In some embodiments, polymer adsorbed clay nanoparticles may be removed from a polymer solution and provided as tags according to embodiments of the present disclosure without an additional step of adding the polymer adsorbed clay nanoparticles into a functionalization solution. For example, in some embodiments, clay nanoparticles may have a hydrophobic surface without being functionalized, where polymer molecules may adsorb into clay nanoparticles and remain adsorbed while being circulated through a well without using a hydrophobic/hydrophilic sealing technique.

Figure 2:
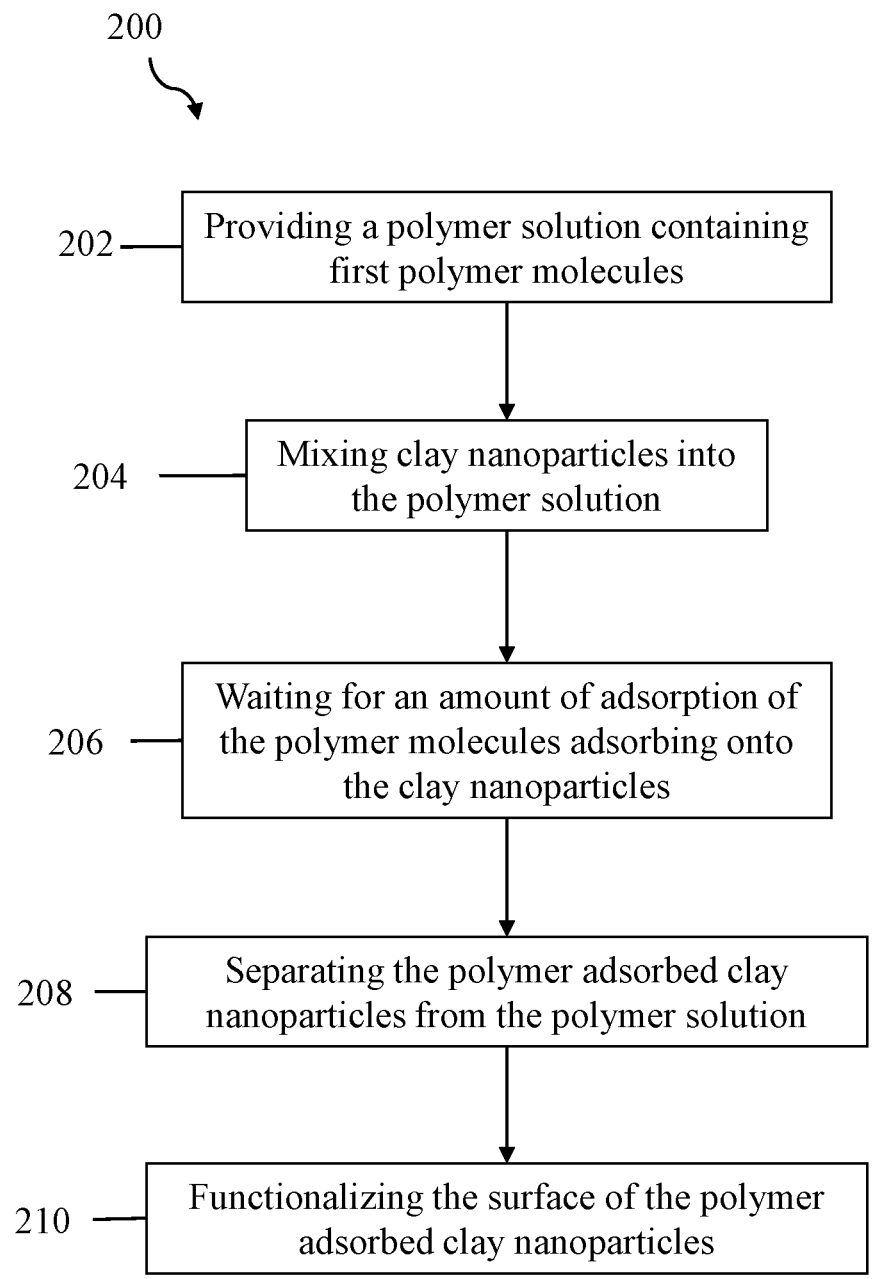
FIG. 2 shows a block flow diagram of a method in accordance with one or more embodiments of the present disclosure.

FIG. 2 shows an example of a method 200 for forming tags according to embodiments of the present disclosure. The method 200 may include providing a polymer solution containing first polymer molecules 202. The first polymer molecules may be selected or synthesized to have a selected composition and/or molecular weight (e.g., a first molecular weight). Clay nanoparticles may then be mixed in the polymer solution 204. Clay nanoparticles may be added to a polymer solution in an amount that is less than, equal to, or greater than the amount of polymer molecules in the polymer solution. For example, in some embodiments, clay nanoparticles may be added in an amount where the weight ratio of clay nanoparticles to polymer molecules ranges from a lower limit of 5:10, 6:10, or 7:10 to an upper limit of 8:10, 9:10, or 1:1, where any lower limit may be combined with any upper limit. By using a polymer solution having a greater amount of polymer molecules than clay nanoparticles, a greater number of polymer adsorbed clay nanoparticles may be formed in the polymer solution.

The method 200 may further include waiting for an amount of adsorption of the polymer molecules adsorbing onto the clay nanoparticles 206. For example, in some embodiments, the clay nanoparticles may be kept in the polymer solution for a period of time sufficient for polymer molecules to adsorb onto at least 90 percent by volume of the clay nanoparticles in the polymer solution. The amount of time the clay nanoparticles may be kept in the polymer solution may vary and may be selected, for example, based on the ratio of the amount of clay nanoparticles to polymer molecules present in the polymer solution, the pH and/or temperature of the polymer solution, and the amount of adsorption desired. In some embodiments, the time clay nanoparticles are kept in a polymer solution may be increased to allow for an increased amount of adsorption.

After polymer molecules have been adsorbed onto clay nanoparticles, the polymer adsorbed clay nanoparticles may be separated from the polymer solution 208. In some embodiments, the separated polymer adsorbed clay nanoparticles may then be rinsed and/or dried to form a first type of tags, which may be mixed with a drilling fluid for circulating during drilling and tagging cuttings.

In some embodiments, the method 200 may further include functionalizing the surface of the polymer adsorbed clay nanoparticles 210. For example, the polymer adsorbed clay nanoparticles may be functionalized to increase surface hydrophobicity of the polymer adsorbed clay nanoparticles. The functionalized polymer adsorbed clay nanoparticles may form a first type of tags, which may be mixed with a drilling fluid for circulating during drilling and tagging cuttings.

The method 200 shown in FIG. 2 may be repeated to form multiple different types of tags. For example, the method 200 may repeated (or conducted concurrently with forming the first tags) by providing a polymer solution containing a second type of polymer molecule different from the first polymer molecules 202. The same type or a different type of clay nanoparticles may then be mixed in the polymer solution 204 and kept in the polymer solution until an amount of the second polymer molecules are adsorbed onto the clay nanoparticles 206. The second polymer adsorbed clay nanoparticles may then be separated from the polymer solution and functionalized to provide a second type of tags different from the first type of tags. A third type of tags, fourth type of tags, and so forth may likewise be formed.

According to embodiments of the present disclosure, tags may be mixed with a water-based drilling fluid or an oil-based drilling fluid. For example, tags having functionalized surfaces to increase surface hydrophobicity may be mixed with an oil-based drilling fluid. In some embodiments, drilling fluids having tags according to embodiments of the present disclosure may include, for example, a base fluid and at least one clay component, wherein the tags may have at least one property similar to the clay component(s) in the drilling fluid, such as the density of the clay component or surface hydrophilicity/hydrophobicity of the clay component. According to embodiments of the present disclosure, the amount of tags mixed with a drilling fluid may reach about 1% by volume or more in the drilling fluid upon reaching the cuttings. Such concentrations may allow the tags to be detected by the proposed analytical methods after reaching the surface of the well.

For example, according to embodiments of the present disclosure, tags may be designed to have a density that is the same or similar to the density of the clay component(s) in the drilling fluid in which the tags are to be circulated with. In some embodiments, at least one clay component in a drilling fluid may include clay particles having a density within 15 percent of the density of the tags. Further, in some embodiments, tags may have a surface property (e.g., polarity, surface potential, specific surface area, charge density, electrostatic field strength at the surface, etc.) that is the same or similar as the clay component(s) in the drilling fluid. By designing the tags to have the same or similar density and/or surface property as clay component(s) in the drilling fluid, the tags can travel well together with the clay component(s) in the drilling fluid as the mixture is circulated through a well. According to embodiments of the present disclosure, tags may be designed to have the same or similar density and/or surface property as a clay component in the drilling fluid by selecting clay nanoparticles for the tags to be the same type of clay as the clay component in the drilling fluid.

Tags according to embodiments of the present disclosure may be designed to have a selected density and surface properties, for example, by selecting a type of clay material for forming the clay nanoparticles and selecting a type of polymer (e.g., having a selected molecular weight) for incorporating into the clay nanoparticles that are suitable for meeting the selected design criteria.

Experimental Comparison Examples

Samples of different polymers adsorbed onto bentonite clay nanoparticles were prepared for testing and comparison. For each sample, 1 gram of bentonite powder was mixed with 50 mL of a polymer solution, where the polymer solution contained 5 wt % of polymer molecules and $1 \times 10^{-4}$ M dye, Rhodamine B isothiocyanate (BRITC). A sonicator applied sonication to the clay nanoparticles and polymer solution, and the polymer molecules in the polymer solution were allowed to be sorbed into the clay nanoparticles for greater than 12 hours under sonication. A first sample was prepared with PEI polymer molecules (to form PEI polymer adsorbed on bentonite clay nanoparticles). A second sample was prepared with PAA polymer molecules (to form PAA polymer adsorbed on bentonite clay nanoparticles). A third sample was prepared with PDADMAC polymer molecules (to form PDADMAC polymer adsorbed on bentonite clay nanoparticles). A fourth sample was prepared with PVA polymer molecules (to form PVA polymer adsorbed on bentonite clay nanoparticles).

Figure 3:
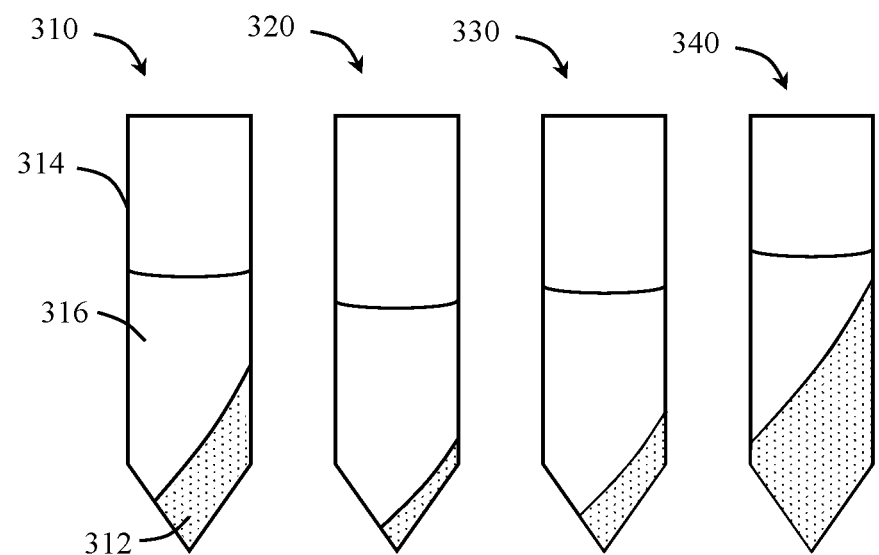
FIG. 3 shows samples of PEI, PAA, PADAMAC and PVA polymers adsorbed onto bentonite clay nanoparticles in a solution prepared in accordance with embodiments of the present disclosure.

After allowing the polymer molecules to adsorb onto the bentonite clay nanoparticles in the polymer solution, the samples were placed in a centrifuge for separation. The force on the solution from the centrifuge separated the polymer adsorbed clay nanoparticles in one side of the sample container and the solution solvent in another side of the sample container. FIG. 3 shows a representation of the first sample 310, the second sample 320, the third sample 330, and the fourth sample 340 after being centrifuged, where the polymer adsorbed clay nanoparticles 312 have been accumulated to one side of the sample container 314 due to centrifugal force of the centrifuge, thereby separating the polymer adsorbed clay nanoparticles 312 from the remainder of the polymer solution 316. As shown in FIG. 3, the centrifugally separated samples 310, 320, 330, 340 show that the bentonite clay nanoparticles may be swollen by polymer molecules in different amounts depending on the type of polymer molecules being adsorbed. In the compared samples, the fourth sample 340 containing PVA polymer molecules adsorbed onto bentonite clay nanoparticles had the largest amount of clay swelling (indicating the largest amount of polymer adsorption of the samples), the first sample 310 containing PEI polymer molecules adsorbed on bentonite clay nanoparticles had the second largest amount of clay swelling, and the second sample 320 containing PAA polymer molecules adsorbed on bentonite clay nanoparticles had the least amount of clay swelling (indicating the least amount of polymer adsorption).

Upon reaching maximum of the polymer adsorption, the polymer adsorbed bentonite particles were separated from the remainder polymer solutions, washed by water through centrifugal filtration, and then dried at 75° C. for greater than 12 hours. By weighing samples and comparing their weights before and after the polymer sorption, saturated sorbed amounts of polymers in bentonite were determined. The results for the amount of polymer sorption in the four comparison samples 310, 320, 330, 340, and additional comparison samples are summarized in Table 1, below.

TABLE 1

Loaded amount of polymer in bentonite particles by sorption in water

| Polymer | Molecular Weight | Loading wt % (Polymer/Clay) | Source of Reagent |
|---|---|---|---|
| PAA: Poly(acrylic acid) | ~5000 | 58.0% | Acros Organics |
| PEI: Poly(ethyleneimine) | 1200 | 26.3% | Polysciences |
| PEI: Poly(ethyleneimine) | ~1800 | 26.3% | Aldrich |
| PAH: Poly(allylamine hydrochloride) | ~120,000-200,000 | 18.4% | Alfa Aesar |
| PVP: Poly(vinylpolypyrrolidone) | 58,000 | 68.4% | Acros Organics |
| PVP: Poly(vinylpolypyrrolidone) | 3500 | | Acros Organics |
| PVA: Poly(vinyl alcohol), hydrolyzed | 16,000 | 65.8% | Acros Organics |
| PVA: Poly(vinyl alcohol), hydrolyzed | 89,000-98,000 | 73.7% | Aldrich |
| PDADMAC: Poly(diallyldimethylammonium chloride) | <100,000 | 34.2% | Aldrich |
| PEG: Polyethylene glycol | 2000 | 34.2% | Alfa Aesar |
| PEO: Poly(ethylene oxide) | ~300,000 | 42.1% | Aldrich |
| Dextran | 150,000 | 13.2% | Sigma |

Figure 4:
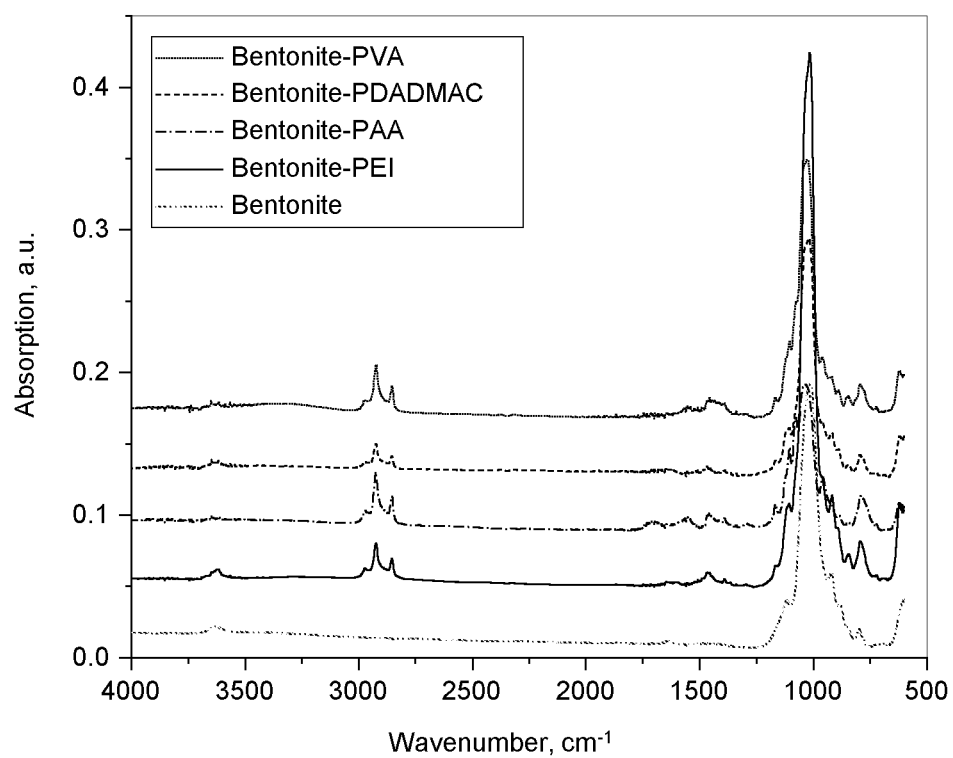
FIG. 4 shows FTIR spectra of bentonite powders with adsorbed PEI, PAA, PADAMAC and PVA polymers prepared in accordance with embodiments of the present disclosure.

From the experimental comparisons, bentonite clay nanoparticles show significant sorption capability for polymers, revealed by its weight increase in 13.2% — 73.7% from adsorbed polymers. FTIR spectra of a few of the samples from the experimental comparisons, shown in FIG. 4, confirm sorption of the polymer compounds in the bentonite clay nanoparticles. As shown in FIG. 4, in the spectral regions of 3000-2800 cm$^{-1}$ and 1700-1200 cm$^{-1}$, vibrational bands of $CH_2$ and $CH_3$ groups from organic compounds appear over that of bentonite, thereby confirming the polymer adsorption.

The experimental comparison samples were prepared without functionalizing the outer surface of the polymer adsorbed clay nanoparticles. However, as discussed above, in one or more embodiments, polymer adsorbed clay nanoparticles may be functionalized to alter one or more surface properties (e.g., increased hydrophobicity).

Method of Correlating recovered Drill Cuttings to Drilling Depth

Figure 5:
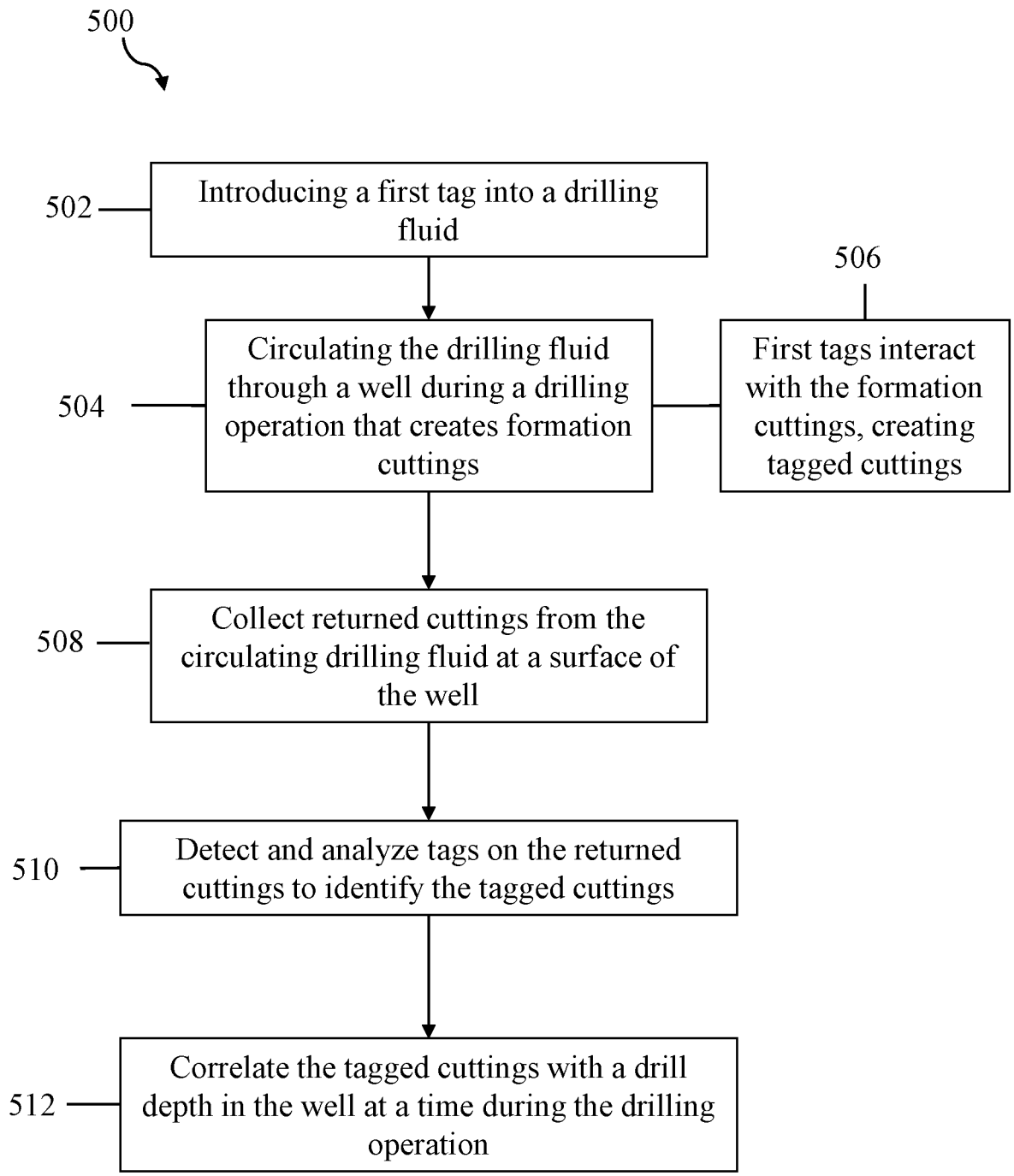
FIG. 5 shows a block flow diagram of a method in accordance with one or more embodiments of the present disclosure.

Tags according to embodiments of the present disclosure may be used to determine the drill depth of drill cuttings. An exemplary method 500 is shown in FIG. 5. The method 500 shown in FIG. 5 includes introducing a first tag into a drilling fluid 502, the first tags formed of a first type of polymer embedded into clay nanoparticles. The first tags may be introduced via the tagging system 140 described with FIG. 1. The first tags may be introduced at a known drill depth.

After the first tag has been introduced into the drilling fluid, the drilling fluid may be circulated through a well during a drilling operation that creates formation cuttings 504. During the process of circulating the drilling fluid as formation cuttings are created, the first tags interact with the formation cuttings, creating tagged cuttings 506.

As drilling fluid is circulated in the well, cuttings, including tagged cuttings, are returned to the surface of the well in the circulating fluid. The method 500 includes collecting these returned cuttings from the circulating drilling fluid at a surface of the well 508. The cuttings may be collected via a cuttings return system 120, such as described with FIG. 1.

Once returned drill cuttings are collected, the presence of the first tags may be detected on the returned cuttings and analyzed to identify the polymers from the tagged cuttings 510. The method 500 then includes correlating the tagged cuttings with a drill depth in the well at a time during the drilling operation 512. The correlation may be made by identifying the polymers of the tags on the tagged cuttings and associating the identified polymer with the first tag that was introduced at a given time. The time at which a particular tag was introduced is associated with a given drill depth.

In one or more embodiments, multiple tags may be used to determine depth of cuttings at different times during the drilling operation. In such embodiments, after the previously described steps, a second tag may be pumped with the drilling fluid down the well. The second tag may attach to and tag formation cuttings as the well is drilled. During the drilling operation, the drill cuttings are returned to the surface of the well as the drilling fluid is circulated, and the presence of the second tags may be detected on the tagged cuttings.

Each of the first tags and the second tags (and any additional subsequent tags) may be correlated with a section of the well drilled at the time the tags were circulated in the well. The cuttings that were tagged with each type of tag may then also be identified as originating from the corresponding section of the well in which the tags were circulated. In such manner, a log of the well may be generated mapping properties of the different tagged cuttings with the corresponding different sections of the well.

The disclosed compositions and methods may allow for more precise depth determination of drill cuttings in real time during drilling operations as compared to conventional methods of analyzing drill cuttings.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:
1. A method, comprising:
introducing a plurality of tags into a drilling fluid, each tag comprising:
 a first clay nanoparticle; and
 a first polymer embedded into the clay nanoparticle;
circulating the drilling fluid and tags through a well during a drilling operation that creates formation cuttings such that the tags interact with the formation cuttings, creating tagged cuttings;
collecting returned cuttings from the circulating drilling fluid at a surface of the well;
detecting the tags on the returned cuttings to identify the tagged cuttings; and
correlating the tagged cuttings with a drill depth in the well from the drilling operation.
2. The method of claim 1, wherein after circulating and correlating for the drill depth, the method further comprises:
drilling to a second depth;
introducing a plurality of second tags into the drilling fluid, each second tag comprising:
 a second clay nanoparticle; and
 a second polymer embedded into the second clay nanoparticle;
 wherein the first polymer has a first molecular weight, and the second polymer has a second molecular weight different from the first molecular weight;

circulating the drilling fluid and second tags through the well during drilling such that the second tags interact with the formation cuttings, creating second tagged cuttings;
collecting returned cuttings from the circulating drilling fluid at the surface of the well;
detecting the second tags on the returned cuttings to identify the second tagged cuttings; and
correlating the second tagged cuttings with the second drill depth in the well.

3. The method of claim 1, wherein after circulating and correlating for the drill depth, the method further comprises:
drilling to a second depth;
introducing a plurality of second tags into the drilling fluid, each second tag comprising:
a second clay nanoparticle; and
a second polymer embedded into the second clay nanoparticle;
wherein the first polymer and the second polymer are different types of polymers;
circulating the drilling fluid and second tags through the well during drilling such that the second tags interact with the formation cuttings, creating second tagged cuttings;
collecting returned cuttings from the circulating drilling fluid at the surface of the well;
detecting the second tags on the returned cuttings to identify the second tagged cuttings; and
correlating the second tagged cuttings with the second drill depth in the well.

4. The method of claim 3, wherein the first and second clay nanoparticles are made of the same clay material.

5. The method of claim 1, wherein detecting comprises:
introducing at least a portion of the tagged cuttings in a solution to release the tags from the formation cuttings; and
analyzing the released tags using laboratory equipment to determine at least one property of the first polymer in the tags.

6. The method of claim 5, wherein the analyzing includes at least one of gel permeation chromatography, liquid chromatography mass spectrometry, and gas chromatography mass spectrometry.

7. The method of claim 5, wherein when the tagged cuttings are introduced in the solution, the method further comprises applying sonication to the tagged cuttings and solution to release the tags from the formation cuttings.

8. The method of claim 5, further comprises altering a pH of the solution to expedite the release of the tags from the formation cuttings.

9. A method comprising:
providing at least two different tags, wherein each of the different tags comprises a polymer with a different molecular weight embedded into a clay nanoparticle;
circulating each of the different tags with a drilling fluid through a well while drilling different sections of the well, wherein the different tags interact with formation cuttings during drilling and circulating, creating different tagged cuttings;
collecting returned cuttings from the circulating drilling fluid at a surface of the well;
detecting the presence of the different tags on the returned cuttings to identify the different tagged cuttings;
correlating each of the different tagged cuttings with the different sections of the well; and generating a log of the well including properties of the different tagged cuttings mapped along the corresponding different sections of the well.

10. The method of claim 9, wherein the different tags comprise a plurality of first tags and a plurality of second tags, and wherein the method comprises
circulating the first tags with the drilling fluid through the well while drilling a first section of the well, wherein the first tags interact with formation cuttings during drilling and circulating, creating first tagged cuttings;
circulating the second tags with the drilling fluid through the well while drilling a second section of the well, wherein the second tags interact with formation cuttings during drilling and circulating, creating second tagged cuttings;
detecting the presence of the first and second tags on the returned cuttings to identify the first and second tagged cuttings; and
correlating the first and second tagged cuttings with the first and second sections of the well;
wherein the log of the well comprises identified properties of the first tagged cuttings mapped in the first section of the well and identified properties of the second tagged cuttings mapped in the second section of the well.

11. The method of claim 9, wherein the drilling fluid is an oil-based drilling fluid.

12. The method of claim 9, wherein the detecting comprises:
introducing at least a portion of the tagged cuttings in a solution to release the tags from the formation cuttings; and
analyzing the released tags using gel permeation chromatography to determine the molecular weight of the polymers in the tags.

13. The method of claim 9, wherein the returned cuttings are collected in a separator.

14. The method of claim 9, wherein at least one of the different tags comprises a dye adsorbed onto the tags.

15. A method, comprising:
forming a plurality of tags, comprising:
providing a polymer solution comprising first polymer molecules having a first molecular weight;
mixing clay nanoparticles in the polymer solution;
waiting for an amount of adsorption of the first polymer molecules adsorbing onto the clay nanoparticles;
separating the polymer adsorbed clay nanoparticles from the polymer solution; and
functionalizing the surface of the polymer adsorbed clay nanoparticles to increase hydrophobicity of the polymer adsorbed clay nanoparticles; and
mixing the tags with a drilling fluid.

16. The method of claim 15, wherein functionalizing comprises:
introducing the polymer adsorbed clay nanoparticles into an organic solvent comprising a silane coupling agent, the silane coupling agent comprising a hydrophobic functional group; and
waiting a time period for the silane coupling agent to graft into the surface of the polymer adsorbed clay nanoparticles,
wherein the functionalized polymer adsorbed clay nanoparticles form the tags having hydrophobic functional groups on the surface of the tags and hydrophilic polymers sealed inside clay layers of the tags.

17. The method of claim 15, wherein the clay nanoparticles are selected from montmorillonite, bentonite, illite, and kaolinite.

18. The method of claim 15, wherein the drilling fluid is an oil-based drilling fluid having a composition comprising:
   a base fluid; and
   at least one clay component,
   wherein the at least one clay component comprises clay particles having a density within 15 percent of the density of the tags.

19. The method of claim 15, further comprising:
   synthesizing the first polymer molecules;
   wherein during synthesizing, at least one functional monomer is incorporated in the first polymer.

20. The method of claim 15, further comprising introducing a dye co-adsorbent into the polymer solution.

\* \* \* \* \*